(12) United States Patent
An et al.

(10) Patent No.: US 8,201,207 B2
(45) Date of Patent: Jun. 12, 2012

(54) APPARATUS AND METHODS FOR MOVING CABLE MODEMS BETWEEN UPSTREAM CHANNELS

(75) Inventors: James S. An, Sunnyvale, CA (US); Hui Sun, San Jose, CA (US); De Fu Li, Wayland, MA (US); Keil Brewer, San Jose, CA (US); John J. Downey, Apex, NC (US); Chrisanto D. Leano, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 848 days.

(21) Appl. No.: 12/334,777

(22) Filed: Dec. 15, 2008

(65) Prior Publication Data

US 2010/0154017 A1    Jun. 17, 2010

(51) Int. Cl.
*H04N 7/173* (2011.01)
(52) U.S. Cl. ........ 725/111; 370/225; 370/252; 370/397; 370/399; 375/219; 375/222; 709/223; 709/224
(58) Field of Classification Search .................. 725/111; 370/225, 252, 397, 399; 375/219, 222; 709/223, 709/224
See application file for complete search history.

(56) References Cited

U.S. PATENT DOCUMENTS

| | | | |
|---|---|---|---|
| 6,453,472 | B1 | 9/2002 | Leano et al. |
| 6,658,010 | B1 | 12/2003 | Enns et al. |
| 2005/0039103 | A1 | 2/2005 | Azenko et al. |
| 2005/0122996 | A1* | 6/2005 | Azenkot et al. ............... 370/477 |
| 2007/0223512 | A1 | 9/2007 | Cooper et al. |
| 2008/0170853 | A1* | 7/2008 | Rakib et al. ..................... 398/26 |
| 2008/0200129 | A1* | 8/2008 | Cooper et al. ............. 455/67.14 |
| 2009/0113503 | A1* | 4/2009 | Al-Banna et al. ............. 725/111 |

OTHER PUBLICATIONS

Improving Bandwidth Utilization by Implementing DOCSIS 2.0 Logical Channels, Motorola, Aug. 25, 2005.
Expanding Bandwidth Using Advanced Spectrum Management, Motorola, Sep. 25, 2003.
Search Report and Written Opinion dated Apr. 20, 2010 for PCT Patent Application No. PCT/US2009/068057.

* cited by examiner

*Primary Examiner* — Farzana Hossain
(74) *Attorney, Agent, or Firm* — Weaver Austin Villeneuve & Sampson LLP (57) ABSTRACT

Disclosed are apparatus and methods for managing upstream channels on a per cable modem basis. In certain embodiments, one or more thresholds are defined for each of a plurality of upstream logical channels of a headend system for receiving data from a plurality of cable modems (or other types of access nodes). Each defined threshold corresponds to a measurable parameter of the corresponding upstream logical channel. One or more metrics are collected for each cable modem of each upstream logical channel. It is determined whether to downgrade a selected cable modem to a selected one of the logical channels that has a lower performance level than the selected cable modem's current logical channel. Such downgrade determination is based on whether the selected cable modem's collected one or more metrics have failed a condition of the one or more defined thresholds and whether a percentage of a total of the cable modems of such current logical channel that have failed a condition for the one or more defined thresholds is less than a predefined percentage level. The selected cable modem is then caused to move from the current logical channel to the selected logical channel when the percentage of the total cable modems that have failed is below a predefined level if such selected logical channel is available. Otherwise, the current logical channel's modulation profile may be altered when the percentage of the total cable modems that have failed is above (or equal to) the predefined level.

23 Claims, 7 Drawing Sheets

APPARATUS AND METHODS FOR MOVING CABLE MODEMS BETWEEN UPSTREAM CHANNELS

BACKGROUND OF THE INVENTION

The present invention relates to measures for managing upstream channels for a cable modem system. More specifically, it relates to managing upstream channels based on data packet transmission loss and the like.

Cable modem technology is in a unique position to meet the demands of users seeking fast access to information services, the Internet and business applications, and can be used by those interested in cable commuting (a group of workers working from home or remote sites whose numbers will grow as the cable modem infrastructure becomes increasingly prevalent). In sum, cable companies are in the midst of a transition from their traditional core business of entertainment video programming to a position as a full service provider of video, voice and data telecommunication services. Among the elements that have made this transition possible are technologies such as the cable modem.

It is usual for companies that provide cable Internet access to require their customers to either purchase or lease a cable modem. The cable modem is typically an external device that connects to a home PC (Personal Computer) through an Ethernet port or the like. In operation, cable modems communicate via a downstream and an upstream channel with a headend device.

Currently, upstream physical layer parameters may be configured based on upstream RF (radio frequency) channel characteristics in order to minimize upstream data packet transmission loss. These dynamically changeable parameters include the upstream channel width (i.e., symbol rate) and the modulation profile. A channel configuration may be based on per channel parameters. Generally, this per channel configuration feature works well. However, improved mechanisms for managing upstream channels would be beneficial for minimizing service disruption.

OVERVIEW

Apparatus and methods for managing upstream channels on a per cable modem basis are provided. In certain embodiments, one or more thresholds are defined for each of a plurality of upstream logical channels of a headend system for receiving data from a plurality of cable modems (or other types of access nodes). Each defined threshold corresponds to a measurable parameter of the corresponding upstream logical channel. The logical channels can correspond to a same physical channel or different physical channels. One or more metrics are collected for each cable modem of each upstream logical channel. It is determined whether to downgrade a selected cable modem to a selected one of the logical channels that has a lower performance level than the selected cable modem's current logical channel. Such downgrade determination is based on whether the selected cable modem's collected one or more metrics have failed a condition of the one or more defined thresholds and whether a percentage of a total of the cable modems of such current logical channel that have failed a condition for the one or more defined thresholds is less than a predefined percentage level. The selected cable modem is then caused to move from the current logical channel to the selected logical channel when the percentage of the total cable modems is below a predefined level if such selected logical channel is available.

In another embodiment, the invention pertains to a headend system that is configured to perform one or more of the above described operations. In another embodiment, the invention pertains to at least one computer readable storage medium having computer program instructions stored thereon that are arranged to perform one or more of the above described operations.

These and other features of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article. The functionality and/or the features of a device may be alternatively embodied by one or more other devices that are not explicitly described as having such functionality/features. Thus, other embodiments of one or more of the invention(s) need not include the device itself.

Devices that are in communication with each other need not be in continuous communication with each other, unless expressly specified otherwise. In addition, devices that are in communication with each other may communicate directly or indirectly through one or more intermediaries. A description of an embodiment with several components in communication with each other does not imply that all such components are required. To the contrary, a variety of optional components are described to illustrate the wide variety of possible embodiments of one or more of the invention(s).

It will be appreciated that one or more embodiments are not limited to cable networks, and may be applied to various types of access networks which use at least one shared access communication channel to communicate between a plurality of nodes in the network and a headend of the network.

In certain cable plant situations, it has been found that only a small subset of cable modems can incur problems, such as high FEC (forward error correction) issues and/or low SNR (signal to noise ratio), e.g., due to where those cable modems are situated in the plant. For example, a small subset of cable modems with extremely high FEC error rates will often affect channel wide statistics and trigger a channel wide parameter to be changed dynamically (referred to as a Dynamic Modulation process), thus, affecting all other cable modems on the same upstream channel. For example, some cable modems may experience traffic disruption, while other cable modems may even go offline. When such an event causes an upstream channel parameter to change into a smaller channel width and/or more robust, lower modulation settings, the data rate will be reduced and will then affect the overall throughput performance for the entire channel.

In general, certain embodiments of the present invention prevent channel wide physical layer parameter changes when only select modems are impaired. Metrics, such as performance parameters, are collected on a per cable modem basis. For example, per cable modem SNR and FEC statistics, in addition to per channel SNR and FEC statistics, are collected and compared against per cable modem SNR and/or FEC thresholds and/or per channel SNR and/or FEC thresholds. When a candidate cable modem is identified and a downgraded target upstream channel is available and reachable, the modem is moved to the target upstream channel that has a compatible channel type with a robust/performance modulation profile of the respective channel.

Selected cable modems may be moved between either channels that correspond to different physical channels or between channels that correspond to different logical channels on a same physical channel. The cable standard DOCSIS (Data Over Cable Service Interface Specification) 2.0 and 3.0 support multiple logical channels on a same physical upstream channel. Each logical channel (or physical channel) could be configured to have a different modulation type. Thus, a logical channel (or physical channel) can be used to group or confine modems with certain degraded physical characteristics, while allowing maximum rates to be maintained for other optimally performing modems on other logical channels.

Although the present invention is described with reference to particular embodiments of a cable modem movement process under a DOCSIS (Data Over Cable Service Interface Specification) 2.0 or 3.0 protocol, techniques of the present invention can similarly be embodied in other versions of the DOCSIS Protocol or with other protocols for any type of data access system.

Figure 1:
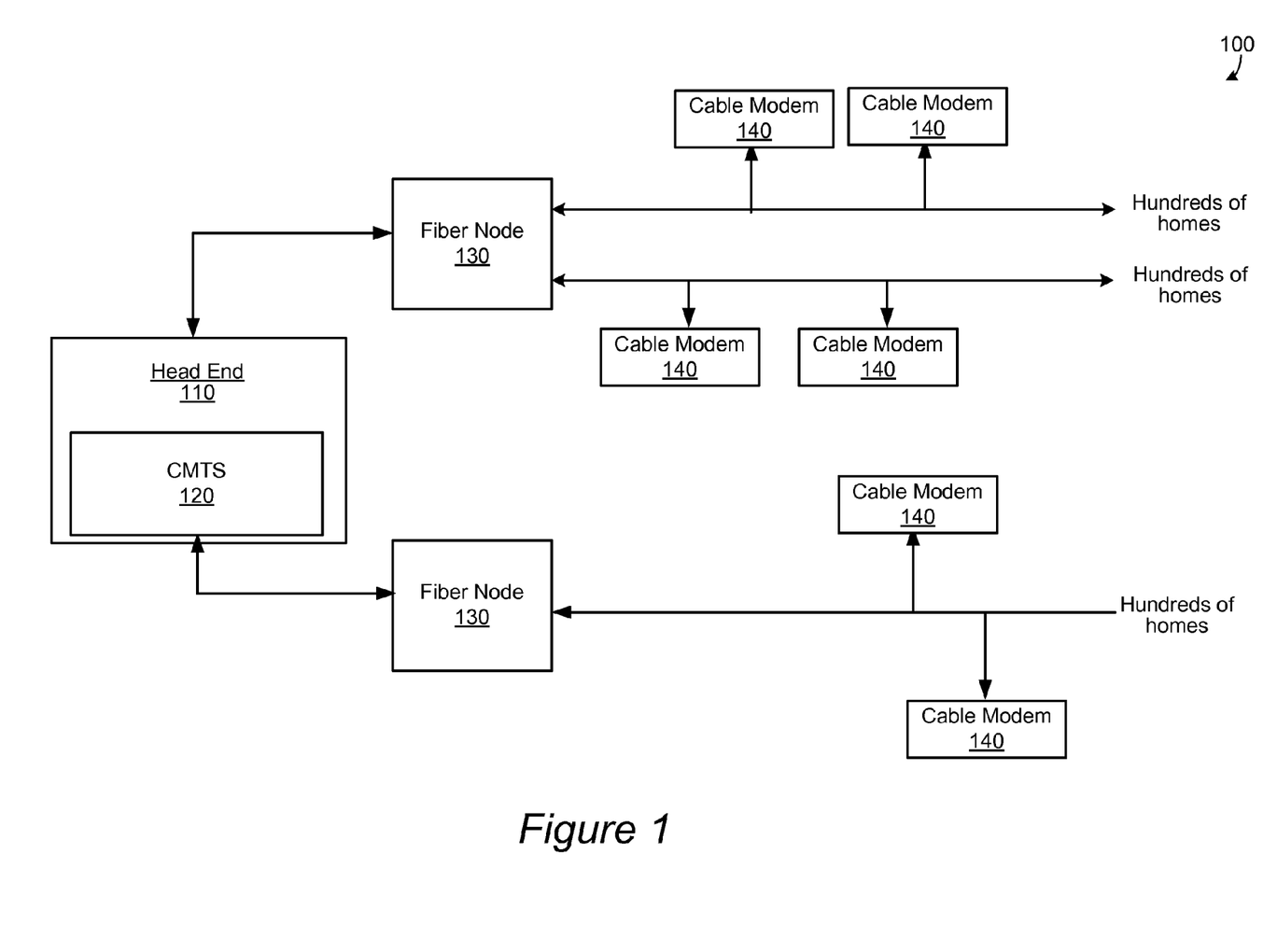
FIG. 1 is a high-level block diagram of a cable system utilizing cable modems for data transmission according to one embodiment of the present invention.

Prior to describing mechanisms for selectively moving cable modems between upstream channels, a computer network architecture will first be briefly described to provide an example context for practicing techniques of the present invention. FIG. 1 is a high-level block diagram of a cable system 100 utilizing cable modems 140 for data transmission according to one embodiment of the present invention. As shown, the cable system can include a headend 110 (e.g., a distribution hub) which can typically service thousands of subscribers. The headend 110 may include a cable modem termination system (CMTS) 120 connected to fiber nodes 130 by pairs of optical fibers. The CMTS can be operable to perform one or more of the following operations: (1) receiving signals from external sources and converting the format of those signals, e.g., microwave signals to electrical signals suitable for transmission over the cable system; (2) providing appropriate Media Access Control (MAC) level packet headers for data received by the cable system, (3) modulating and demodulating the data to and from the cable system, and (4) converting the electrical signal in the CMTS to an optical signal for transmission over the optical lines to the fiber nodes; and/or (5) facilitating the determination of whether to move selected cable modems as described herein.

Headend 110 may be connected through pairs of fiber optic lines (one line for each direction) to a plurality of fiber nodes 130. Each of the fiber nodes 130 may be connected by a coaxial cable to two-way amplifiers or diplex filters (not shown) which permit certain frequencies to go in one direction and other frequencies to go in the opposite direction. Each fiber node 130 can normally service a plurality of subscribers. Fiber nodes 130, coaxial cable, two-way amplifiers, plus distribution amplifiers, and subscriber taps, e.g., branch lines, can make up the coaxial distribution system of a cable system. A subscriber tap may be connected to a cable modem. A cable modem may, in turn, be connected to a subscriber computer (not shown).

In certain embodiments, cable systems can be used for two-way transmission of data. The data may be Internet data, digital audio, or digital video data, in MPEG format, for example, from one or more external sources. Such data access networks can serve as extensions of the typical cable network used for broadcasting cable television.

Data on the upstream and downstream channels can be carried over radio frequency (RF) carrier signals. Cable modems can take the form of devices that convert digital data to a modulated RF signal and convert the RF signal back to digital form. The conversion can be performed at two points: at the subscriber's home by a cable modem and by a CMTS located at the headend. The CMTS can be configured to convert digital data to a modulated RF signal which is carried over the fiber and coaxial lines to the subscriber premises. The cable modem can then demodulate the RF signal and feed the digital data to a computer. On the return path, the operations may be reversed. The digital data can be fed to the cable modem which converts it to a modulated RF signal. Once the CMTS receives the RF signal, the CMTS can demodulate the signal and transmit the digital data to an external source.

In order for a cable system to provide digital communications, subscribers are typically equipped with cable modems 140. The cable modem 140, an improvement of an ITU (International Telecommunication Union) V.series type modem, can provide high speed connectivity so as to allow the cable system to take the form of a full service provider of video, voice and data telecommunications services. To access cable services, a subscriber typically first buys or leases a cable modem 140, registers the cable modem with a local cable system, connects an RF coaxial cable to the cable modem, and connects the cable modem to an Ethernet port (or the like) on his/her personal computer. These processes can serve to connect the subscriber's computer to the cable system. Additionally, the cable modem typically then performs a registration process with the CMTS 120 before such cable modem can actually send or receive data.

Figure 2:
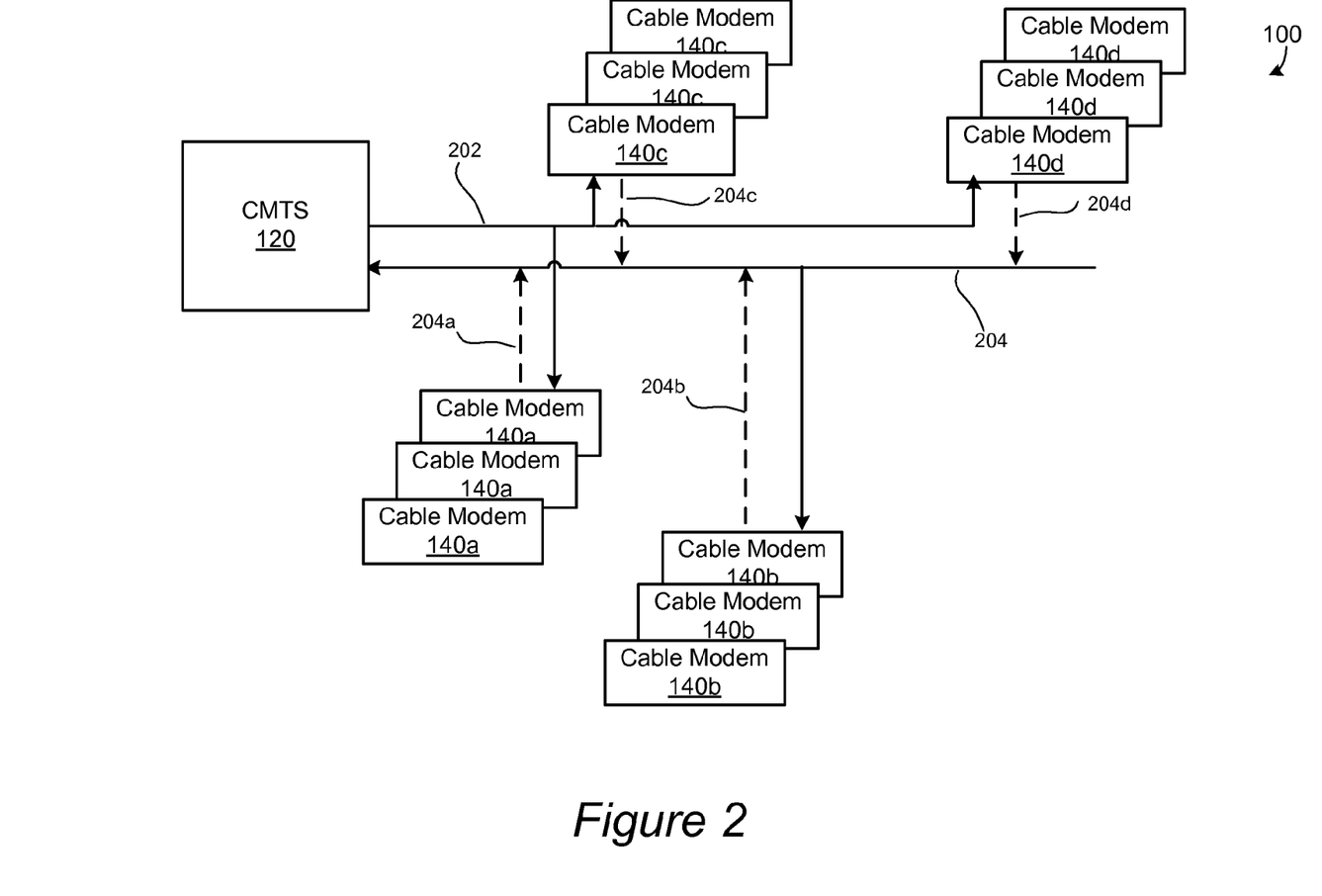
FIG. 2 is a high-level block diagram of a portion of a two-way, multiple logical upstream channel cable system utilizing cable modems for data transmission according to one embodiment of the present invention.

FIG. 2 is a high-level block diagram of a portion of a two-way, multiple logical upstream channel cable system 100 utilizing cable modems for data transmission according to one embodiment of the present invention. In some implementations, the system 100 can include two data paths (downstream 202 and upstream 204) between each cable modem 140 and a CMTS 120 of headend 110 that allows for the two-way transmission of digital data. A typical upstream port of the CMTS 120 may be coupled to a high number of cable modems 140 (e.g., 10~1,000). In other implementations, each cable modem may have access to multiple upstream data paths (not shown).

DOCSIS 2.0 and 3.0 support multiple logical channels on a physical upstream. As shown, the upstream channel 204 is divided into multiple upstream logical channels, e.g., 204a~204d, to which different sets of cable modems, e.g., 140a~140d respectively, have access. Multiple logical channels on a single physical line may be achieved in any suitable manner, such as a time multiplexing technique. Each logical channel may be configured with a different modulation profile, e.g., a 64QAM vs. 16QAM constellation rate.

Embodiments of the present invention facilitate moving selected cable modems between different logical upstream channels or different physical upstream channels. In the following description, the phrase "logical channel" can denote a particular logical channel that is one of several logical channels of a physical line, or can denote a single logical or physical channel that does not share the physical line with other logical channels. In other words, a logical channel can correspond to a single physical channel.

Figure 3:
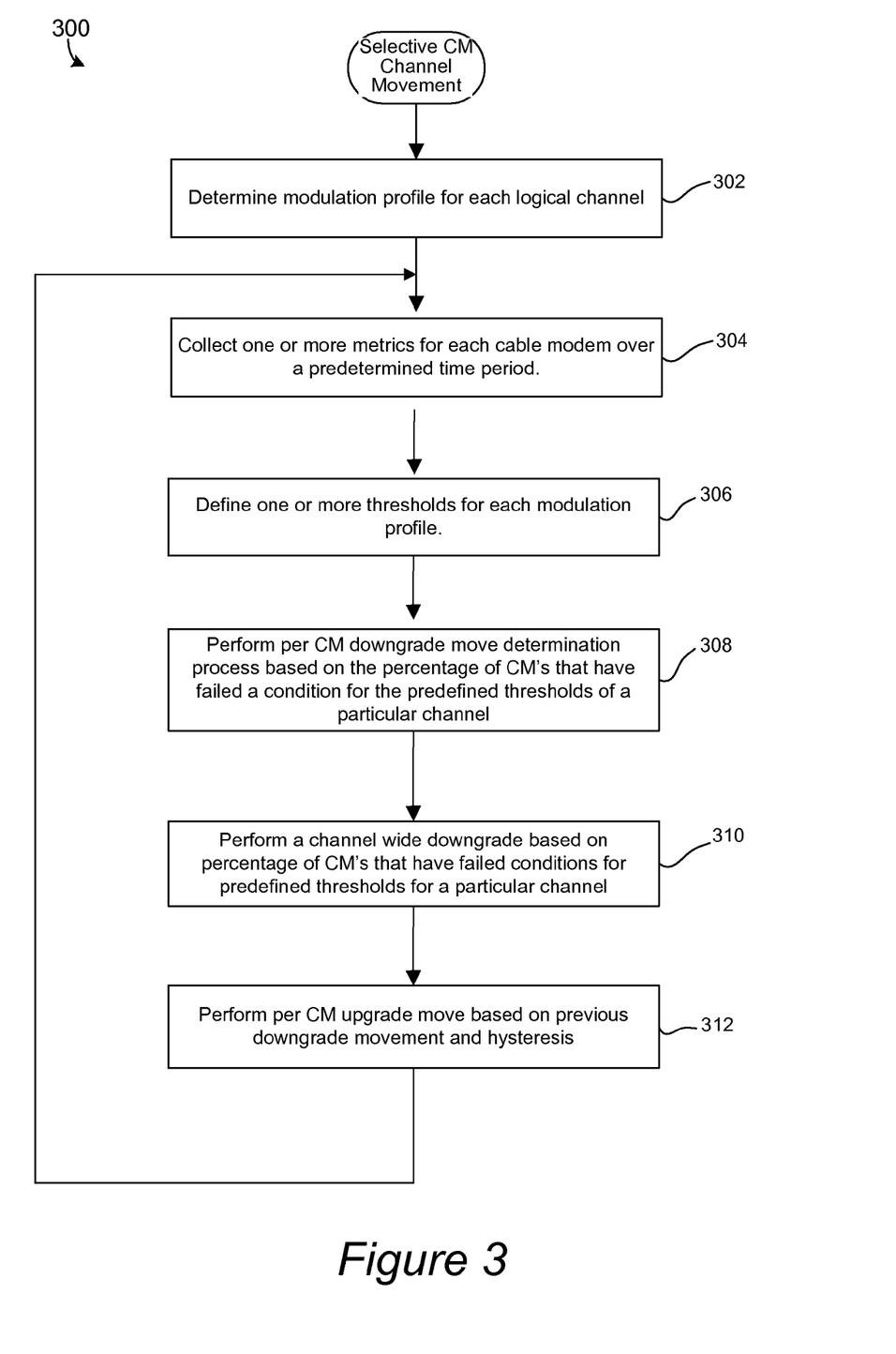
FIG. 3 is a flow chart illustrating a procedure for selective cable modem channel movement in accordance with one embodiment of the present invention.

FIG. 3 is a flow chart illustrating a procedure 300 for selective cable modem channel movement in accordance with one embodiment of the present invention. One or more of these process operations may be repeated periodically. These operations may also be performed in any suitable order.

Initially, a modulation profile for each logical channel may be determined in operation 302. Any combination of physical and logical channels may be configured with a different modulation profile for setting the transmission characteristics of each channel. For example, the logical channels of each physical channel may be configured with different modulation profiles. If one or more physical channels are not divided into logical channels (e.g., the physical channel correspond to a single logical channel), each physical channel may be configured with a particular modulation profile.

In general, the modulation profile can define the burst transmission parameters such as modulation order (e.g., QPSK, 16QAM, etc), preamble training length, FEC settings, or any other parameter which affects modulation performance. These parameters can be selected such that the CMTS is able to reliably receive cable modem burst transmission for a given physical channel condition. For typical applications, two types of modulation profiles can be broadly defined—a robust type and a performance type. Robust modulation profiles may utilize a QPSK (Quadrature Phase Shift Keying) modulation format, longer preambles, or higher FEC settings, by way of example. A performance modulation profile may utilize a 32QAM (quadrature amplitude modulation) or 64QAM modulation format, shorter preamble length, lower FEC overhead settings, etc., by way of example. A robust modulation profile would be more immune to noise and be able to be applied to a channel with a lower SNR. In contrast, a performance type modulation profile can be designed for a higher rate, but would require a cleaner channel, e.g., high SNR. Some examples modulation profiles may utilize any one of the following formats: 64QAM, 32QAM, 16QAM, 8QAM, QPSK, shorter or longer preambles, higher or lower FEC overhead settings, etc.

In a DOCSIS 2.0 or 3.0 implementation, each channel (logical or physical) is defined in an Upstream Channel Descriptor (UCD) MAC message, which is periodically transmitted by the CMTS to the cable modems. The UCD message defines various aspects of a particular channel, such as a channel identifier, modulation rate, modulation type, burst characteristics, encoding characteristics, configuration change count that indicates how many times the particular channel has been reconfigured, frequency, a plurality of mode fields to indicate various S-CDMA characteristics, a Ranging Required field to indicate whether initial ranging by the cable modem is required, etc. Each cable modem may be initially assigned to a particular channel during a registration process (e.g., via an Upstream Bandwidth Allocation Map or MAP message). Each cable modem then transmits on the specified upstream channel using the specified modulation profile.

Referring back to the process of FIG. 3, one or more metrics for each cable modem (and channel) may be collected by the CMTS, for example, over a predetermined time period in operation 304. In one implementation, one or more of the following metrics may be measured for each cable modem, as well as the entire channel: cable modem SNR, channel SNR, cable modem CFEC (corrected Forward Error Correction/ total number of codewords received from cable modem), channel CFEC (corrected FEC/total number of codewords received from all cable modems on the channel), cable modem UFEC (uncorrectable FEC/total number of codewords received from cable modem), channel UFEC (uncorrectable FEC/total number of codewords received from all cable modems on the channel), etc.

Forward error correction (FEC) encoding is often incorporated into a data stream in order to decrease the bit error rate. In some embodiments, FEC adds additional information to the data stream to detect and correct any errors that are caused by the transmission system. The additional information is added to each message in a systematic way so that the resultant codewords have a one-to-one relation to the messages.

Algorithms used for FEC may include convolutional codes, Hamming codes, and BCH (Bose-Chaudhuri-Hocquenghem) codes, by way of examples. BCH codes form a large class of powerful random error-correcting cyclic codes, and have the advantage of being robust and very efficient in terms of the relatively low number of check bits required. Reed Solomon codes are an example of a class of BCH codes. A Reed Solomon FEC process is described in Data-Over-Cable Service Interface Specifications (DOCSIS) protocol such as for example, the *Data-Over-Cable Service Interface*

Specifications, DOCSIS 2.0, Radio Frequency Interface Specification, SP-RFIv2.0-I05-040407, Cable Television Laboratories, Apr. 7, 2004, which document is incorporated herein by reference. Alternative FEC techniques are further described in U.S. Pat. No. 7,366,969, issued Apr. 29, 2008, which patent is incorporated herein by reference.

BCH codes, including Reed Solomon codes, can be specified with three primary parameters, n, k, and T, where n=block length (the length of the message bits plus the additional check bits), k=message length (the number of data bits included in a check block), and t=correctable errors (the number of errors per block which the code can correct). For example, if T is 10 bytes, up to 10 byte errors can be corrected in the k portion. If the number of bytes that are in error exceeds 10 bytes, these errors cannot be corrected. Accordingly, if there were some errors in a given codeword and the number of these errors does not exceed the value specified by T, this codeword error can be defined as a correctable error (e.g., CFEC). When the byte errors exceed the T bytes, however, these errors can be defined as an uncorrectable error (e.g., UFEC). Per DOCSIS 2.0 FEC, T values can range from 1 through 16 bytes. For DOCSIS1.0/1.x, the T value is limited to 1 through 10 bytes. However, there is more overhead associated with increasing the T byte, which is a tradeoff for achieving higher error correctability.

According to a specific embodiment, the CFEC metric is a value which describes the following ratio:

$$\text{CFEC} = \frac{\text{Correctable FEC codewords received}}{\text{Total number of codewords received}}, \quad (1)$$

where "Correctable FEC codewords received" refers to the number of corrupted codewords received via the selected channel (during a predetermined time interval) that can be corrected using Forward Error Correction (FEC), and "Total number of codewords received" refers to the total number of codewords received on the selected channel during the same predetermined time interval. Typically, one transmission data packet can include one or more codewords.

According to a specific embodiment, the UFEC metric is a value which describes the following ratio:

$$\text{UFEC} = \frac{\text{Uncorrectable FEC codewords received}}{\text{Total number of codewords received}},$$

where "Uncorrectable FEC codewords received" refers to the number of corrupted codewords received via the selected channel (during a predetermined time interval) that can not be corrected using Forward Error Correction (FEC), and "Total number of codewords received" refers to the total number of codewords received on the selected channel during the same predetermined time interval.

Referring to the process of FIG. 3, one or more thresholds for each modulation profile may be defined in operation 306. A threshold may be defined for each collected metric at which an alert may be triggered for possibly moving selected cable modems to a different channel.

In one implementation, a channel SNR threshold may be user configurable and dependent on the particular channel's modulation profile. For instance, a modulation profile that is more immune to noise (e.g., QPSK) can have a lower SNR threshold, while a modulation profile that is designed for a higher rate (e.g., 32QAM, 64QAM, etc.) can have a higher SNR threshold. In one implementation, the cable modem SNR threshold may be derived from the channel SNR threshold and may be user configurable. In one example, a downgrade threshold is selected to be significantly below or above the corresponding channel threshold although they can also be equal to each other in alternative embodiments. In an example of the former embodiment, the cable modem SNR threshold for a downgrade may equal the channel SNR threshold minus a user configurable X db value, while a cable modem SNR for an upgrade may equal the channel SNR threshold minus the user configurable X db value.

Defaults may be defined for the channel CFEC and UFEC thresholds. For example, the channel CFEC may equal 3% and the channel UFEC may equal 1%. The cable modem CFEC and UFEC threshold values may be based on corresponding channel threshold values and a user configurable amount. For example, cable modem CFEC and UFEC threshold values for a downgrade may equal the channel CFEC+Y % and channel UFEC+Y % (or a different Z %), respectively.

Similarly, the cable modem CFEC and UFEC threshold values for an upgrade may be equal to channel CFEC-Y % and UFEC-Y % (or Z %), respectively. In another implementation, the cable modem CFEC and UFEC threshold values for an upgrade may equal the maximum of either a minimum default, such as 1%, or the channel CFEC-Y % and UFEC-Y % (or Z %), respectively. The user configurable parameters X, Y, and/or Z may specify settings for fine tuning the per cable modem thresholds. In one embodiment, the default values for X, Y may equal 3 db and 2%, respectively.

Experimental evidence suggests that the predefined CFEC channel threshold may vary depending upon other factors of the modulation profile such as, for example, the FEC-t byte value. According to a specific embodiment, the range of the values of the CFEC channel threshold may vary depending on the FEC-t byte value. According to a specific implementation, the FEC-t byte value may range from 0-10 bytes. Using this range, experimental evidence suggests that the FEC factor may vary as shown below in Table 1.

TABLE 1

| FEC-t bytes | FEC Factor (in %) |
|---|---|
| 1 to 3 bytes | 1% |
| 4 to 5 bytes | 2% |
| 6 to 8 bytes | 3% |
| 9 to 10 bytes | 6% |

Thus, according to one implementation, the CFEC or UFEC threshold value (for a channel or cable modem) may be selected from a range of values such as, for example, 1-6 percent, depending upon the FEC-t byte value.

Referring to FIG. 3, a per cable modem downgrade move determination process may be performed based on the percentage of cable modems that have failed a condition for the predefined thresholds for a particular channel in operation 308. For instance, when a low number or percentage of cable modems have failed to meet a condition for the defined one or more thresholds for a particular channel, these failing cable modems may be downgraded to a different logical or physical channel.

A channel wide downgrade may also be performed based on the percentage of cable modems that have failed a condition for the predefined thresholds for a particular channel in operation 310. For example, if a high number or percentage of cable modems have failed a condition of the predefined one or more thresholds, the entire channel and all its associated cable modems may be downgraded to a downgraded modulation profile.

A per cable modem upgrade move process may be performed based on previous downgrade movements and hysteresis in operation 312. That is, it may be determined whether previously downgraded cable modems can be moved back to their upgraded channel.

Figure 4:
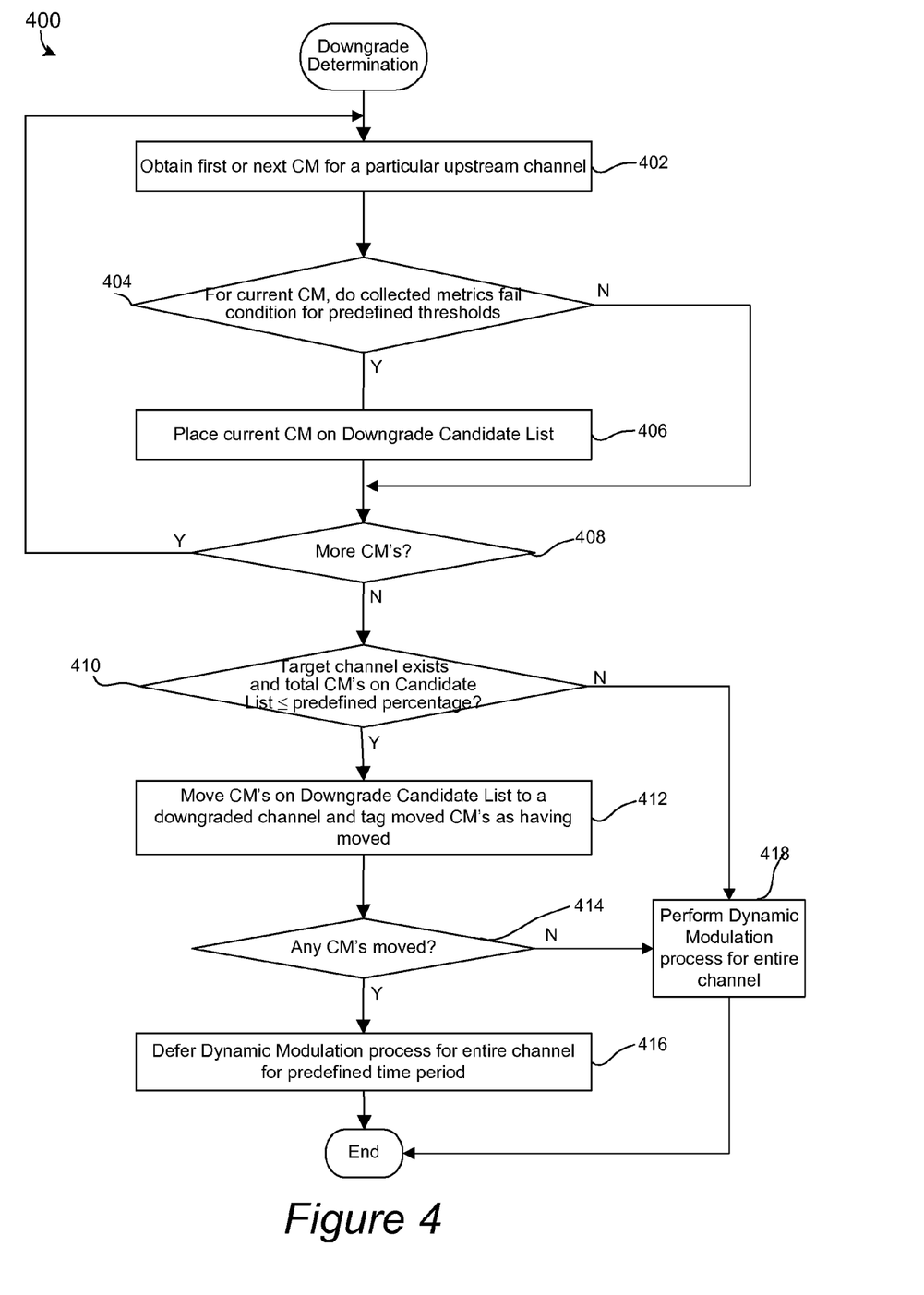
FIG. 4 is a flow chart illustrating a procedure for a downgrade determination process in accordance with a specific implementation of the present invention.

FIG. 4 is a flow chart illustrating a procedure 400 for a per cable modem downgrade determination process in accordance with a specific implementation of the present invention. A procedure for determining when to downgrade selected cable modems from a particular channel may be performed periodically based on any suitable criteria. For example, such a downgrade determination process may be performed each time per cable modem metrics are collected for a predefined period of time, e.g., after expiration of a collection timer, which is reset at each downgrade determination process. The procedure of FIG. 4 is described with respect to a single upstream channel (e.g., logical or physical) although such process may be applied to any number and type of channels.

Initially, a first cable modem for a particular upstream channel is obtained in operation 402. It is then determined whether the collected metrics for the current cable modem fail a condition for the predefined thresholds in operation 404. Any suitable condition may be specified for the collected metrics failing the predefined thresholds. In one example, the metrics fail the condition when the current cable modem SNR is less than the cable modem SNR threshold for downgrading and either the current cable modem CFEC is greater than or equal to the cable modem CFEC threshold for downgrading or the current cable modem UFEC is greater than or equal to the cable modem UFEC threshold for downgrading.

If the metrics fail the condition for the predefine thresholds, the current cable modem may be placed on a Downgrade Candidate list in operation 406. Otherwise this operation is skipped. It may then be determined whether there are any more cable modems in the particular upstream channel to analyze in operation 408. If there are more cable modems, the next cable modem in the particular upstream channel is obtained in operation 402 and it is then determined whether to place such next modem on the Downgrade list. These operations for placing cable modems on a Downgrade Candidate list may be repeated for all the modems on the particular upstream channel.

It may then be determined whether a target channel exists and the total number of cable modems on the Candidate list is less than or equal to a predefined percentage in operation 410. A target downgrade channel has a compatible channel type and has one or more steps lower than the currently assessed upstream channel. For example, if a cable modem is currently in a TDMA (time division multiplex access) channel with a 16QAM modulation profile, it can be moved to another TDMA channel with a QPSK modulation profile. Compatibility criteria may include any suitable factors, such as whether the origin or destination channels have the same channel types (e.g., TDMA, ATDMA, SCDMA), are similar in other physical layer parameters such as channel width or equalization parameters, subscriber service offerings, etc. If no such target channel exists which is reachable by such moving cable modem, then the cable modem will not be moved. Additionally, individual cable modems will not be moved if a significant percentage of cable modems (e.g., over 10%) are failing the predefined thresholds condition.

If there are more modems on the Downgrade Candidate list than the predefined percentage or there is no target channel, a dynamic modulation process may be performed for the entire channel in operation 418 as described further herein. If a target channel exists and the total cable modems are on the Downgrade Candidate list are less than or equal to a predefined percentage, the cable modems on the Downgrade Candidate list are then moved to a target downgrade channel and the moved cable modems are tagged as having moved in operation 412. For example, the cable modems are moved to a target downgrade channel that is compatible and has a modulation profile that is one step (or more) lower than the current upstream channel. In a DOCSIS implementation a UCC (Upstream Channel Change) request may be used to downgrade a modem to a different logical or physical channel or a DCC (Dynamic Channel Change) request may be used to downgrade a modem to a different physical channel. A DCC request may also be used when a cable modem is moving to a channel that has a different MAC domain than the current upstream channel. In any of these request examples, the CMTS may specify the upstream channel identifier of the downgraded channel to the cable modem so that the cable modem can then transmit on the specified downgrade channel using the modulation profile that was previously specified for such downgrade channel (e.g., via a upstream channel descriptor or UCD message).

A selected cable modem may be moved to an upstream channel that is one level below its current channel's level. A channel level may correspond to the channel's relative robustness vs. performance. For example, a 32QAM upstream channel may be considered to be one level lower than a 64 QAM upstream channel. Alternatively, a selected cable modem may be moved a number of downgrade levels based on how far the cable modem has exceeded or gone below its predefined thresholds. For example, the first set of thresholds may be defined so as to determine whether to move the cable modem 1 level; a second set of thresholds may be defined so as to determine whether to move the cable modem 2 levels, etc.

Referring back to FIG. 4, it may also be determined whether any cable modems have moved in operation 414. For instance, it is determined whether a cable modem is specified as moved, such as by a moved cable modem list. If any cable modems have moved, a dynamic modulation process may be deferred for the entire channel for a predefined time period in operation 416. Otherwise, if no modems have moved, such dynamic modulation process is performed in operation 418 (e.g., according to a normal schedule) so that the entire channel may be downgraded, for example to a lower level modulation profile. The procedure 400 may then end.

Dynamic modulation may include any suitable mechanisms or techniques for dynamically changing the modulation profile of an entire channel (e.g., logical or physical). Several embodiments of dynamic modulation are further described in U.S. Pat. No. 6,891,858, issued 10 May 2005, which patent is incorporated herein by reference. In general, it may periodically be determined whether to change the modulation profile of an entire channel (or move all of the modems of such channel to another channel) based on the metrics for such channel. A channel's modulation profile may be altered in any suitable manner. For example, a new UCD configuration can be sent out for the reconfigured channel, and such new UCD indicates that an existing channel that is identified by a unique channel identifier has a new configuration count. The new UCD may specify that initial ranging is also required. Each cable modem can then transmit on the reconfigured upstream channel at the new modulation profile when it has determined that such channel has a new configuration count and after initial ranging is performed (if required by the CMTS).

However, certain embodiments of the present invention will defer this dynamic modulation process when only a selected number of cable modems have been moved to a downgraded channel. The deferment delay for a particular channel may be selected so that the process for determining whether to downgrade selected modems from such particular channel can be repeated prior to the dynamic modulation process. If more modems are moved, the dynamic modulation process can be deferred again. The dynamic modulation process can be repeatedly deferred each time modems are selectively moved until a significant percentage of modems are placed on the Downgrade list, at which time the dynamic modulation process may be reinstated to reconfigure the entire channel to a downgraded modulation profile (or move all modems to a downgraded channel).

When a cable modem has been downgraded, certain embodiments of the present invention allow such downgraded modem to be upgraded again when the modem presents more acceptable metrics (e.g., decreased loss rates). However, measures may be taken to ensure that the modem is not upgraded too soon so as to prevent frequent transitions between downgraded and upgraded channels for a modem that is operating close to metric thresholds.

Figure 5:
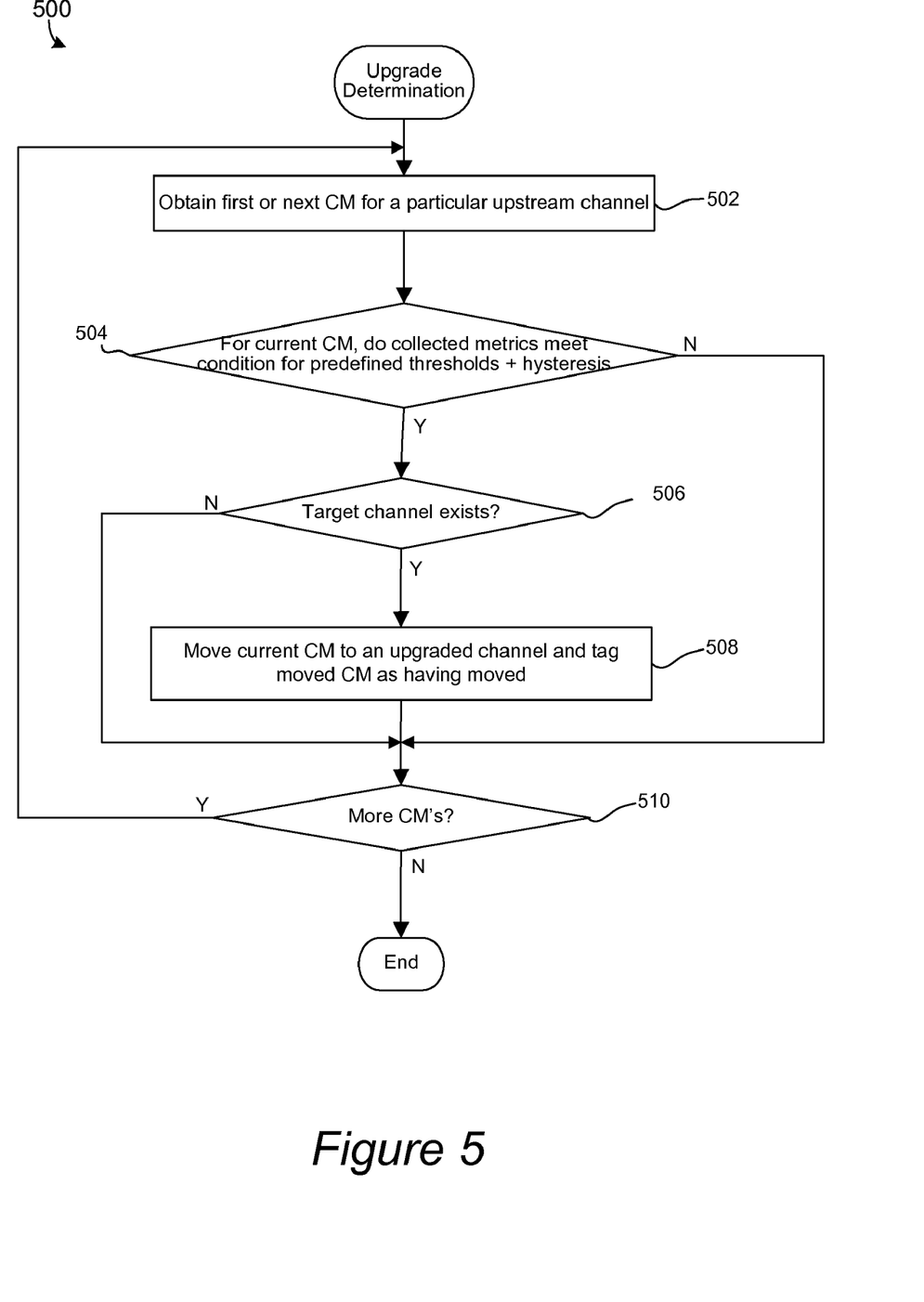
FIG. 5 is a flowchart illustrating a procedure for an upgrade determination process in accordance with one embodiment of the present invention.

FIG. 5 is a flowchart illustrating a procedure 500 for an upgrade determination process in accordance with one embodiment of the present invention. Initially, a first cable modem is obtained for a particular upstream channel in operation 502. It may then be determined for the current cable modem, whether the collected metrics meet a condition for the predefined threshold and a hysteresis condition in operation 504. For example, a hysteresis value may be introduced and used with one or more threshold values. In a specific example, it is determined whether the following upgrade condition is met: the current cable modem SNR is greater than or equal to the cable modem SNR threshold for upgrading plus a hysteresis amount (e.g., 3 db) and either the current cable modem CFEC is less than or equal to the cable modem CFEC threshold for upgrading or the current cable modem UFEC is less than or equal to the cable modem UFEC threshold for upgrading.

If such condition for upgrading is met, it may also be determined whether a target channel exists in operation 506. For example, it is determined whether a compatible channel that has a modulation profile that is at least one step higher than the current channel exists for the current cable modem. If a target channel exists, the current cable modem may be moved to an upgraded channel and such moved cable modem may be tagged as having moved in operation 508. For instance, the current modem is moved to a compatible channel that has a modulation profile that is one or more levels higher than the current channel's modulation profile. Otherwise, such upgrading operation is skipped.

A cable modem may be tagged as being upgraded for various reasons, for example, so as to prevent oscillations, statistics gathering and reporting, etc. A count for each cable modem may be updated each time a cable modem moves (e.g., upgrades and/or downgrades). When the count reaches a predetermined number, the cable modem may be inhibited from upgrading so as to prevent frequent oscillations between downgraded and upgraded channels.

After the first cable modem is processed (e.g., upgraded or not), it may then be determined whether there are more cable modems in the particular upstream channel in operation 510. If there are no more cable modems, the procedure 500 may end. Otherwise, the procedure 500 repeats for the next cable modem in the particular upstream channel in operation 502.

Generally, the technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention may be implemented in software such as an operating system or in an application running on an operating system.

A software or software/hardware hybrid system of this invention is preferably implemented on a general-purpose programmable machine selectively activated or reconfigured by a computer program stored in memory. Such a programmable machine may be a network device designed to handle network traffic. Such network devices typically have multiple network interfaces. One important class of device that may be used to implement the present invention is the Cable Modem Termination System. Preferably, the CMTS is a "routing" CMTS, which handles at least some routing functions. Alternatively, the CMTS may be a "bridging" CMTS, which handles only lower-level tasks.

Figure 6:
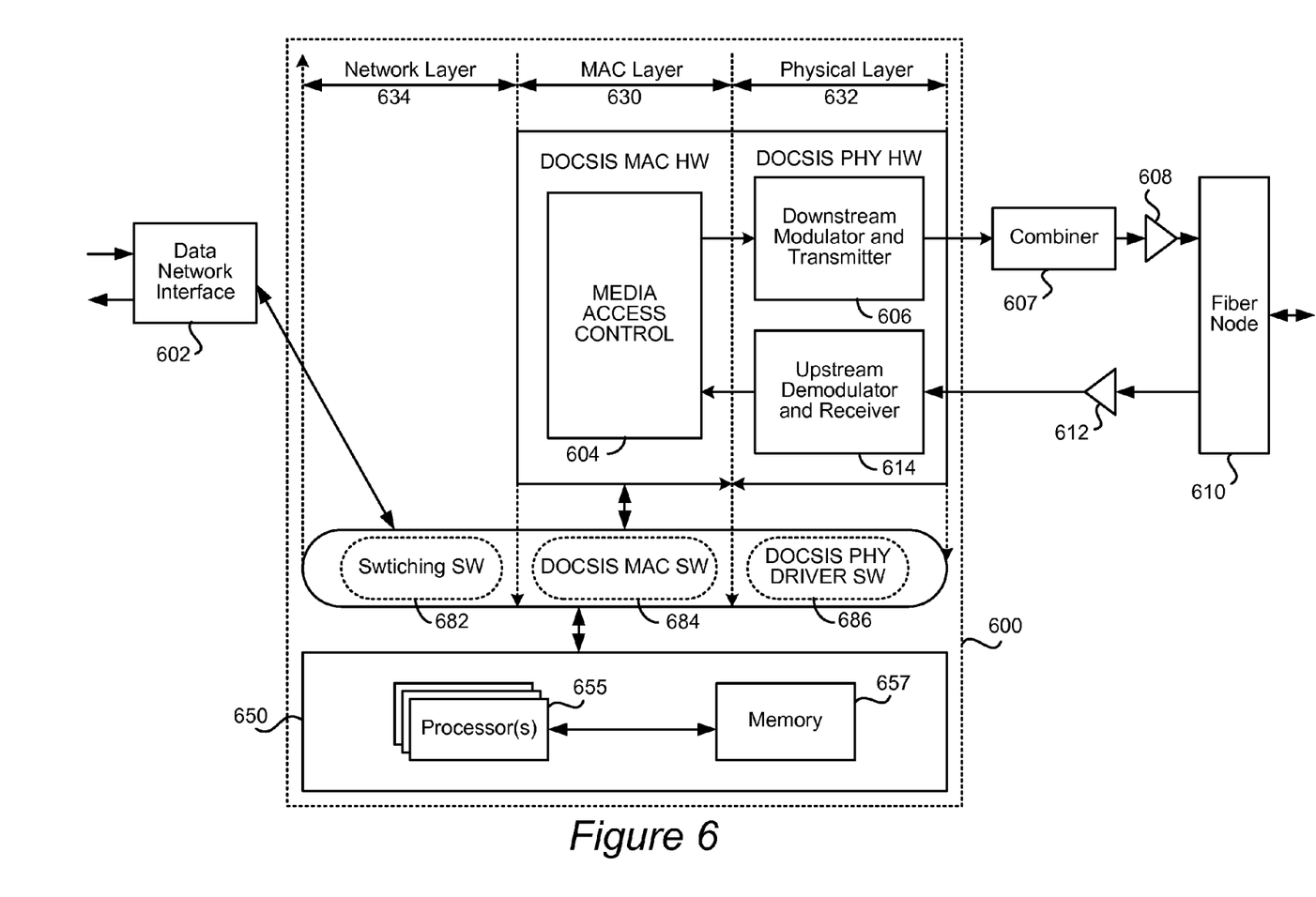
FIG. 6 is a diagrammatic representation illustrating a Cable Modem Termination System (CMTS) that may be used to implement certain aspects of this invention.

FIG. 6 provides an example of some components of a CMTS that may be used to implement certain aspects of this invention. In the specific embodiment as shown in FIG. 6, a CMTS 600 provides functions on three network layers including a physical layer 632, a Media Access Control (MAC) layer 630, and a network layer 634. Generally, the physical layer is responsible for receiving and transmitting RF signals on the cable plant. Hardware portions of the physical layer include a downstream modulator and transmitter 606 and an upstream demodulator and receiver 614. The physical layer also includes software 686 for driving the hardware components of the physical layer.

Upstream optical data signals (packets) arriving via an optical fiber node 610 are converted to electrical signals by a receiver 612. Next, the upstream information packet (RF electrical signals) is demodulated by the demodulator/receiver 614 and then passed to MAC layer block 630. A primary purpose of MAC layer 630 is to encapsulate, with MAC headers, downstream packets and decapsulate, of MAC headers, upstream packets. In one embodiment, the encapsulation and decapsulation proceed as dictated by the above-mentioned DOCSIS standard for transmission of data or other information. The MAC headers include addresses to specific modems or to the CMTS (if sent upstream) by a MAC layer block 630 in CMTS 600. Note that the cable modems also include MAC addressing components. In the cable modems, these components encapsulate upstream data with a header containing the MAC address of the CMTS.

MAC layer block 630 includes a MAC hardware portion (e.g. MAC controller) 604 and a MAC software portion 684, which together serve the above-described functions. In a preferred embodiment, MAC hardware portion 604 is distinct from the router's general-purpose microprocessor and is dedicated to performing some MAC layer functions.

In specific CMTS configurations, the hardware portions of the physical layer 632 and MAC layer 630 reside on a physical linecard within the CMTS. The CMTS may include a plurality of distinct linecards which service particular cable modems in the network. Each linecard may be configured to have its own unique hardware portions of the physical layer 632 and MAC layer 630.

After MAC layer block 630 has processed the upstream information, it is then passed to network layer block 634. Network layer block 634 includes switching software 682 for causing the upstream information packet to be switched to an appropriate data network interface on data network interface 602. When a packet is received at the data network interface 602 from an external source, the switching software within network layer 634 passes the packet to MAC layer 630. MAC block 600 then transmits information via a one-way communication medium to downstream modulator and transmitter 606. Downstream modulator and transmitter 606 takes the data (or other information) in a packet structure and converts it to modulated downstream frames, such as MPEG or ATM frames, on the downstream carrier using, for example, 64QAM modulation. Other methods of modulation may also be used such as, for example, 256QAM modulation, etc. The return data is likewise modulated using, for example, 16QAM, 32QAM, 64QAM, QSPK, etc. According to a specific embodiment, the modulated data is converted from IF electrical signals to RF electrical signals (or vice-versa) using one or more electrical signal converters (not shown). Data from other services (e.g. television) may be added at a combiner 607. An optical converter 608 converts the modulated RF electrical signals to optical signals that can be received and transmitted via Fiber Node 610 to the cable modem hub.

Note that alternate embodiments of the CMTS (not shown) may not include network layer 634. In such embodiments, a CMTS device may include only a physical layer and a MAC layer, which are responsible for modifying a packet according to the appropriate standard for transmission of information over a cable modem network. The network layer 634 of these alternate embodiments of CMTS devices may be included, for example, as part of a conventional router for a packet-switched network. In a specific embodiment, the network layer of the CMTS is configured as a cable linecard coupled to a standard router that includes the physical layer block 632 and MAC layer block 630. Using this type of configuration, the CMTS is able to send and/or receive IP packets to and from the data network interface 602 using switching software block 682.

The data network interface 602 is an interface component between external data sources and the cable system. The external data sources transmit data to the data network interface 602 via, for example, optical fiber, microwave link, satellite link, or through various media. The data network interface includes hardware and software for interfacing to various networks such as, for example, Ethernet, ATM, frame relay, etc.

As shown in FIG. 6, CMTS 600 includes a central hardware block 650 including one or more processors 655 and memory 657. These hardware components interact with software and other hardware portions of the various layers within the CMTS. They provide general purpose computing power for much of the software. Memory 657 may include, for example, I/O memory (e.g. buffers), program memory, shared memory, etc. One or more data structures used for implementing the technique of the present invention may reside in such memory. Hardware block 650 may physically reside with the other CMTS components. In one embodiment, the software entities 682, 684, and 686 are implemented as part of a network operating system running on hardware 650. Preferably, at least a part of the selective cable modem channel movement process of this invention is implemented in software as part of the operating system. In FIG. 6, such software may be part of MAC layer software 684 and/or the switching software 682, or may be closely associated therewith. Of course, the selective cable modem channel movement logic of the present invention could reside in hardware, software, or some combination of the two.

Procedures employed by the CMTS during registration and pre-registration are preferably performed at the MAC layer of the CMTS logic. Thus, in CMTS 600, most of the registration operations would be performed by the hardware and software provided for MAC layer logic 630. Operations associated with obtaining an IP address for cable modems are preferably implemented at the network layer level 634. This process may involve the CMTS communicating with a DHCP server (not shown) via data network interface 602, for example.

The selective cable modem movement techniques of the present invention may be implemented on various general purpose Cable Modem Termination Systems. In a specific embodiment, the systems of this invention may be specially configured CMTS's such as, for example, specially configured models in the uBR-10 k series or the uBR-7200 series of CMTS's available from Cisco Systems, Inc. of San Jose, Calif. In an alternative embodiment, the methods of this invention may be implemented on a general-purpose network host machine such as a personal computer or workstation. Further, the invention may be at least partially implemented on a card (e.g., an interface card) for a network device or a general-purpose computing device.

Although the system shown in FIG. 6 represents one specific CMTS architecture of the present invention, it is by no means the only CMTS architecture on which the present invention can be implemented. For example, other types of interfaces and media could also be used with the CMTS.

Regardless of network device's configuration (for cable plants or otherwise), it may employ one or more memories or memory modules (e.g., memory 657) configured to store program instructions for the network operations and other functions of the present invention described herein. The program instructions may specify an operating system and one or more applications, for example. Such memory or memories may also be configured to store data structures or other specific non-program information described herein.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

While the discussion to this point has focused on selective cable modem channel movement techniques for cable networks, the technology of the present invention may be applied to any access or shared-access network having a plurality of hosts or nodes which share at least one channel for communicating with at least one "headend" in the network. Examples of shared-access networks include, in addition to cable networks, wireless networks, Ethernet, FastEthernet, GigabitEthernet, LANs, etc. In the cable network, the plurality of nodes represents a plurality of cable modems that communicate with at least one CMTS at the centralized termination system using at least one shared-access upstream and downstream channel.

In general, the methods and apparatus described above may be implemented on a traffic handling device (e.g., a switch or router) for providing selective cable modem channel movement capability in a network having at least one traffic handling device (e.g., another switch or router) that provides normal service to a host. In the wireless system (e.g., represented by FIG. 7) the plurality of nodes or hosts corresponds to the plurality of wireless nodes 750 which use at least one shared access channel to communicate with at least one access control system 722 located at the headend of the wireless system.

Figure 7:
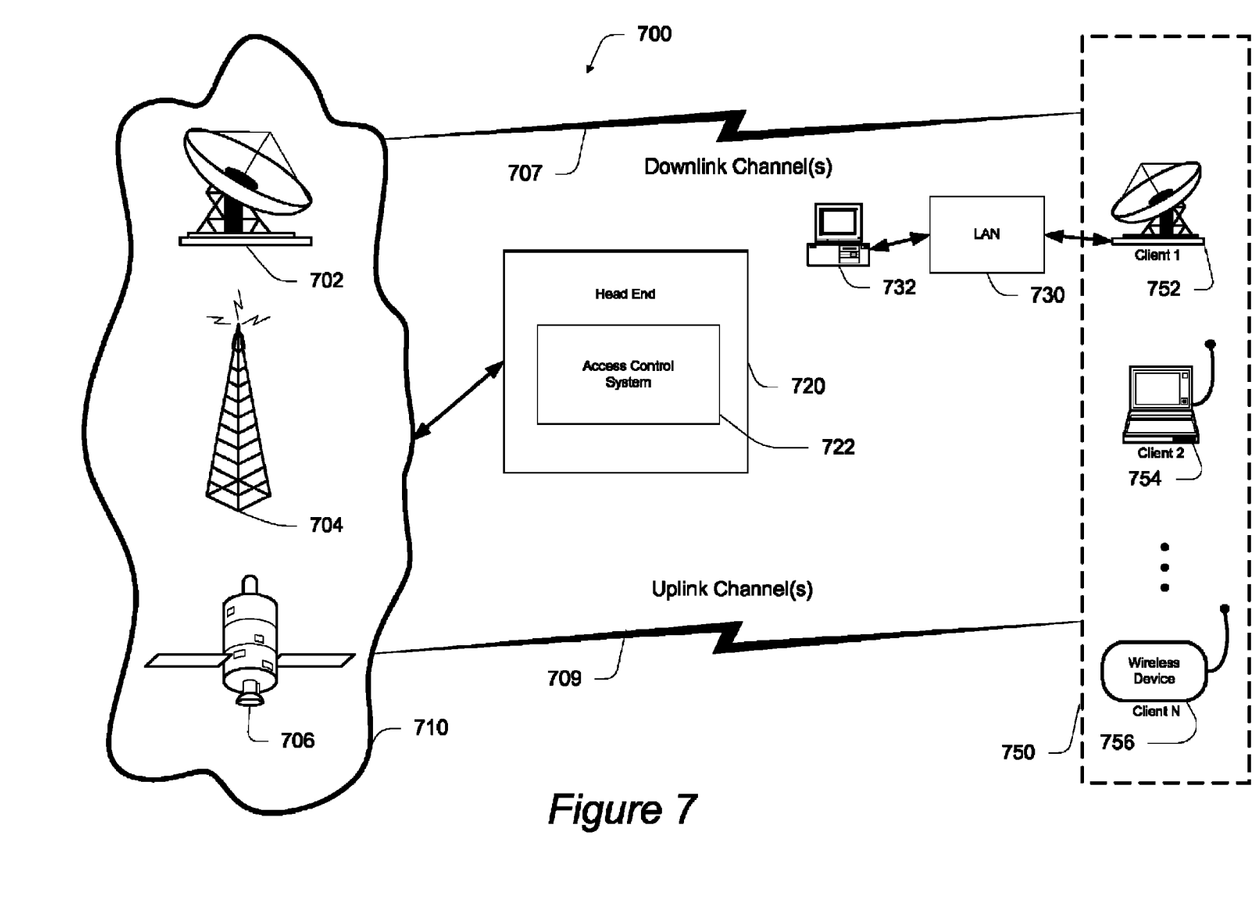
FIG. 7 shows a block diagram of a wireless network which may be used for implementing techniques of the present invention.

As shown in FIG. 7, the wireless system includes a central termination system (or headend) 720. The headend includes an access controller or access control system (ACS) 722 which communicates with a plurality of wireless nodes 750, and coordinates access between each of the wireless nodes and the headend 720. The access controller 722 may include memory and at least one processor. In a specific embodiment, the function of the access controller 722 is analogous to that of the CMTS described above with respect to cable modem networks. It may serve as a router or switch as well.

The headend 720 communicates with a plurality of wireless nodes 750 via any one of a plurality of wireless transmitting and receiving devices 710. As shown in FIG. 7, for example, the plurality of wireless transmitting and receiving devices 710 may include satellite base stations 702, orbital satellites 706, radio towers 704, etc.

In a specific embodiment which is analogous to that of cable modem networks, the headend 720 of the wireless computer system communicates with the plurality of nodes 750 via one or more downlink channels 707 and one or more uplink channels 709. Each downlink channel 707 is a broadcast-type channel utilized by the headend to communicate with an associated group of wireless nodes within the wireless network. The uplink channel 709 is a shared-access channel, which is utilized by a group of wireless nodes (analogous to cable modems) to communicate with the headend 720. The access controller 722 stores registration parameters for the various nodes that it services. It may also store the IP addresses for nodes that it services.

In a specific embodiment of the present invention, the registration process and information is similar to that of the cable network CMTS's described above. Moreover, the technique of the present invention for selective cable modem channel movement capability over a shared access data network may be implemented in wireless system 700.

The wireless devices or nodes 750 may include any one of a number of wireless transmitting/receiving devices. For example, a satellite dish 752 may be used to communicate with the headend 720 via the uplink and downlink channels. The satellite dish may, in turn, be connected to a local area network (LAN) 730 which may be further connected to one or more computer systems 732. Another wireless device may be a portable/wireless computer system 754, which is able to transmit and receive information to the headend via uplink and downlink channels 707 and 709. Other wireless devices 756 may include, for example, wireless telephones, handheld computing devices, etc.

In specific embodiments where the uplink and downlink channels within the wireless system 700 are utilized in a manner similar to that of the upstream and downstream channels of a cable modem network, the above-described selective cable modem channel movement techniques may easily be implemented in wireless system 700 using the detailed description of the present invention provided herein. Moreover, the technique of the present invention may be easily implemented in any computer network which uses shared access channels for communicating between a centralized computing system and one or more remote nodes.

It will be appreciated that the technique of the present invention is not limited to cable networks, and may be applied to any access data network which uses at least one shared access communication channel to communicate between a plurality of nodes in the network and a headend of the network.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method comprising:
defining one or more thresholds for each of a plurality of upstream logical channels of a headend system for receiving data from a plurality of cable modems, wherein each defined threshold corresponds to a measurable parameter of the corresponding upstream logical channel;
collecting one or more metrics for each cable modem of each upstream logical channel;
determining whether to downgrade a selected cable modem to a selected one of the logical channels that has a lower performance level than the selected cable modem's current logical channel,
wherein such downgrade determination is based on whether the selected cable modem's collected one or more metrics have failed a condition of the one or more defined thresholds and whether a percentage of a total of the cable modems of such current logical channel that have failed a condition for the one or more defined thresholds is less than a predefined percentage level; and
causing the selected cable modem to move from the current logical channel to the selected logical channel when the percentage of the total cable modems is below a predefined level.

2. The method of claim 1, wherein determining whether to downgrade the selected cable modem comprises:
for each cable modem of the current logical channel, assessing whether such each cable modem's collected one or more metrics have failed a condition of the one or more defined thresholds and placing such each cable modem on a downgrade candidate list when such each cable modem's collected one or more metrics have failed a condition of the one or more defined thresholds; and
after each cable modem has been assessed, moving all of the cable modems that were placed on the downgrade candidate list to the selected logical channel when the cable modems that are on the downgrade candidate list constitute a percentage of the total cable modems of the current logical channel that is less than or equal to the predefined percentage level.

3. The method of claim 2, further comprising moving all of the cable modems of the current logical channel to the selected logical channel when the cable modems that are on the downgrade candidate list constitute a percentage of the total cable modems of the current logical channel that is greater than the predefined percentage level.

4. The method of claim 2, further comprising deferring a process for assessing whether to move all the cable modems of the current logical channel to the selected logical channel when the cable modems that are on the downgrade candidate list constitute a percentage of the total cable modems of the current logical channel that is less than or equal to the predefined percentage level.

5. The method of claim 2, further comprising:
for each cable modem that has been moved to the selected logical channel, determining whether to upgrade such each cable modem back to the current logical channel based on whether such each cable modem's collected one or more metrics have met the condition of the one or more defined thresholds plus one or more corresponding hysteresis amounts; and moving the each cable modem back to the current logical channel when it is determined that such each cable modem is to be upgraded.

6. The method of claim 5, further comprising:

periodically repeating the operations for determining whether to downgrade a each cable modem and determining whether to upgrade such each cable modem and moving such each cable modem when it is determined that such each cable modem is to be downgraded or upgraded;

tracking a count for each time a selected cable modem is downgraded or upgraded; and inhibiting an upgrade move for a particular cable modem when the count for such particular cable modem exceeds a predefined number.

7. The method of claim 1, wherein each logical channel is a different physical channel.

8. The method of claim 1, wherein the logical channels are on a same physical channel.

9. The method of claim 1, wherein the logical channels have different modulation profiles that result in different transmission speeds.

10. The method of claim 1, wherein the predefined thresholds include one or more of the following thresholds for each cable modem: a correctable forward error correction (FEC) ratio threshold, an uncorrectable FEC ratio threshold, and/or a signal to noise threshold.

11. The method of claim 1, wherein the selected logical channel has a lower performance level that is one or more levels lower than the current logical channel and the number of levels that the selected logical channel is lower depends on how much the selected cable modem's collected metrics have failed the condition.

12. A system for facilitating communications in an access network, the access network including a plurality of nodes, the system comprising:

a headend in communication with at least a portion of the network nodes via a plurality of upstream logical channels having different modulation profiles;

the headend being further configured to perform the following operations:

defining one or more thresholds for each of the upstream logical channels, wherein each defined threshold corresponds to a measurable parameter of the corresponding upstream logical channel;

collecting one or more metrics for each node of each upstream logical channel;

determining whether to downgrade a selected node to a selected one of the logical channels that has a lower performance level than the selected node's current logical channel, wherein such downgrade determination is based on whether the selected node's collected one or more metrics have failed a condition of the one or more defined thresholds and whether a percentage of a total of the nodes of such current logical channel that have failed a condition for the one or more defined thresholds is less than a predefined percentage level; and causing the selected node to move from the current logical channel to the selected logical channel when the percentage of the total nodes is below a predefined level.

13. The system of claim 12, wherein determining whether to downgrade the selected node comprises:

for each node of the current logical channel, assessing whether such each node's collected one or more metrics have failed a condition of the one or more defined thresholds and placing such each node on a downgrade candidate list when such each node's collected one or more metrics have failed a condition of the one or more defined thresholds; and after each node has been assessed, moving all of the nodes that were placed on the downgrade candidate list to the selected logical channel when the nodes that are on the downgrade candidate list constitute a percentage of the total nodes of the current logical channel that is less than or equal to the predefined percentage level.

14. The system of claim 13, wherein the headend being is further configured to move all of the nodes of the current logical channel to the selected logical channel when the nodes that are on the downgrade candidate list constitute a percentage of the total nodes of the current logical channel that is greater than the predefined percentage level.

15. The system of claim 13, wherein the headend being is further configured to defer a process for assessing whether to move all the nodes of the current logical channel to the selected logical channel when the nodes that are on the downgrade candidate list constitute a percentage of the total nodes of the current logical channel that is less than or equal to the predefined percentage level.

16. The system of claim 13, further comprising:

for each node that has been moved to the selected logical channel, determining whether to upgrade such each node back to the current logical channel based on whether such each node's collected one or more metrics have met the condition of the one or more defined thresholds plus one or more corresponding hysteresis amounts; and moving the each node back to the current logical channel when it is determined that such each node is to be upgraded.

17. The system of claim 16, further comprising:

periodically repeating the operations for determining whether to downgrade a each node and determining whether to upgrade such each node and moving such each node when it is determined that such each node is to be downgraded or upgraded;

tracking a count for each time a selected node is downgraded or upgraded; and inhibiting an upgrade move for a particular node when the count for such particular node exceeds a predefined number.

18. The system of claim 12, wherein each logical channel is a different physical channel.

19. The system of claim 12, wherein the logical channels are on a same physical channel.

20. The system of claim 12, wherein the logical channels have different modulation profiles that result in different transmission speeds.

21. The system of claim 12, wherein the predefined thresholds include one or more of the following thresholds for each node: a correctable forward error correction (FEC) ratio threshold, an uncorrectable FEC ratio threshold, and/or a signal to noise threshold.

22. The system of claim 12, wherein the selected logical channel has a lower performance level that is one or more levels lower than the current logical channel and the number of levels that the selected logical channel is lower depends on how much the selected cable modem's collected metrics have failed the condition.

23. At least one non-transitory computer readable storage medium having computer program instructions stored thereon that are arranged to perform the following operations:

defining one or more thresholds for each of a plurality of upstream logical channels for receiving data from a plurality of nodes, wherein each defined threshold corresponds to a measurable parameter of the corresponding upstream logical channel;

collecting one or more metrics for each node of each upstream logical channel;

determining whether to downgrade a selected node to a selected one of the logical channels that has a lower performance level than the selected node's current logical channel, wherein such downgrade determination is based on whether the selected node's collected one or more metrics have failed a condition of the one or more defined thresholds and whether a percentage of a total of the nodes of such current logical channel that have failed a condition for the one or more defined thresholds is less than a predefined percentage level; and causing the selected node to move from the current logical channel to the selected logical channel when the percentage of the total nodes is below a predefined level.

* * * * *